UNITED STATES PATENT OFFICE.

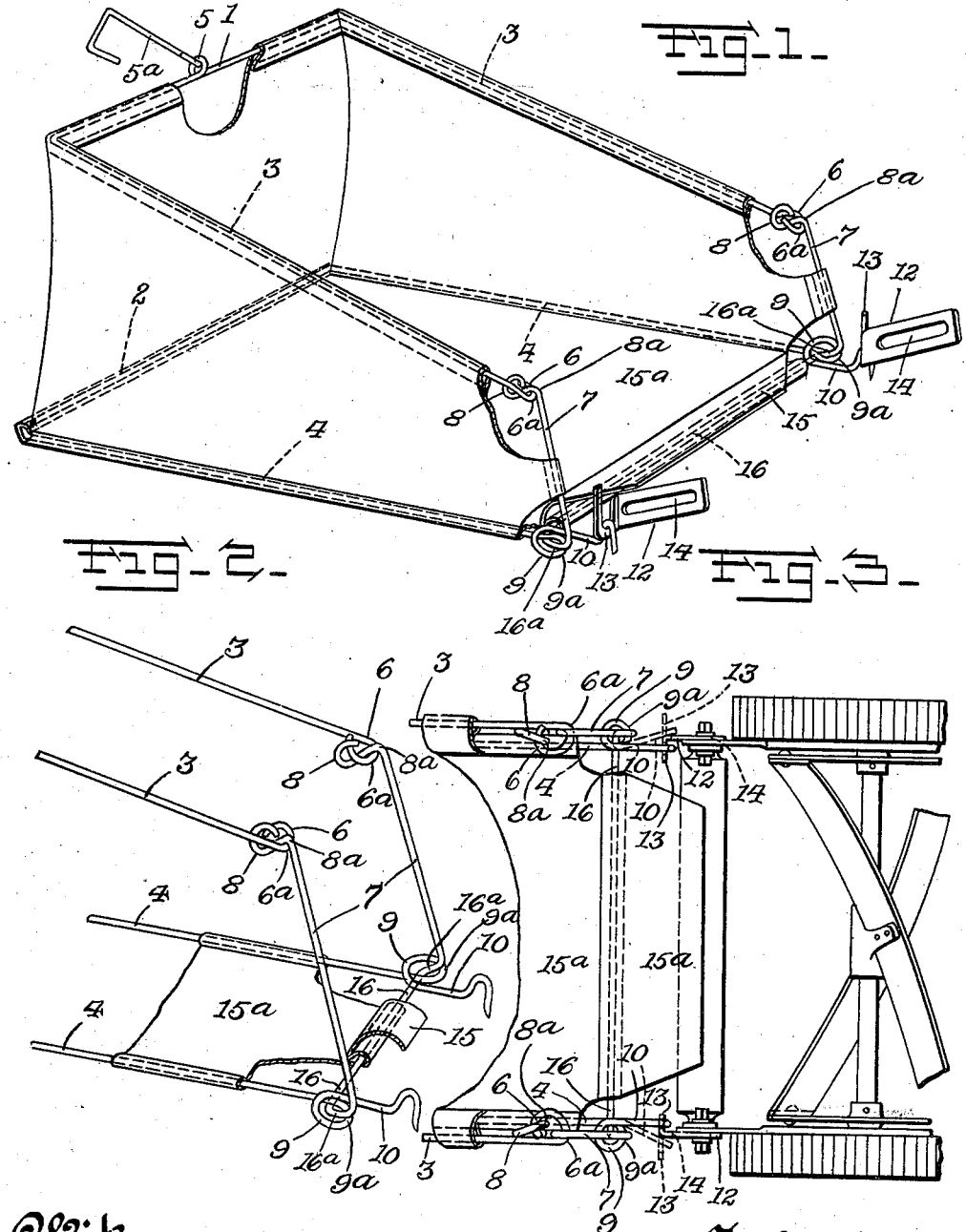

ADOLPH E. MEYER, OF WEBSTER GROVES, MISSOURI, ASSIGNOR TO ZITTLOSEN MANUFACTURING CO., OF ST. LOUIS, MISSOURI.

GRASS-CATCHER.

996,108. Specification of Letters Patent. Patented June 27, 1911.

Application filed October 13, 1910. Serial No. 586,895.

*To all whom it may concern:*

Be it known that I, ADOLPH E. MEYER, a citizen of the United States, residing at Webster Groves, in the county of St. Louis, State of Missouri, have invented a new and useful Grass-Catcher, of which the following is a specification.

This invention relates to improvements in receptacles popularly known as grass catchers; and, among others, its objects are to afford a receptacle of the character described whose frames, while freely collapsible rearwardly, are positively prevented from falling forward and contacting with the wheels and blades of the mower to the damage of the latter as well as the catcher, and to afford a novel, effective, and inexpensive means whereby the catcher may be readily adapted for use upon mowers of all usual widths. These desiderata, and others which will become apparent hereafter and from a consideration of the appended claims, are attained through the peculiar features of construction hereinafter described in detail and illustrated in the accompanying drawing, in which like numerals denote like parts throughout.

Figure 1 is a perspective of my completed receptacle; Fig. 2 a detail view, on slightly enlarged scale, of the means for preventing the frames from falling forward; and Fig. 3 depicts, in enlarged detail, the devices used in attaching and adjusting the catcher to a mower.

For simplicity of description my complete device may be said to comprise seven (7) individual elements, to wit:—an upper frame; a lower frame; a floor or bottom mounted upon said lower frame; an adjustable lip formed of the margin of said floor adjacent the mower; opposed front stays, rising at a right angle from a rod supporting and protecting the front margin of said floor and hingedly engaging said upper frame; devices prolonged from the opposite forward extremities of said lower frame; and peculiarly shaped hooks designed for engagement to the side plates of the mower and coöperating with said devices to support the catcher. Said upper and lower frames consist simply of two lengths of suitable material, preferably wire, which are bent to form an upper rear bar 1 and a lower rear bar 2, and upper side rods 3 and lower side rods 4. Disposed in rear bar 1 is an eyelet 5, locking in definite position supporting member 5ª, at the forward ends of side rods 3 are horizontally disposed eyelets 6; at the free ends of front stays 7 are provided downstruck eyelets 8; while the forward extremities of side rods 4 are coiled to afford a comparatively wide loop 9, from which are prolonged arms 10.

In practice I provide, as a feature of this grass catcher, hooks 12, having a portion 13 bent at a right angle to the remainder and provided with an elongated slot 14 for the entrance of bolts used upon all mowers for adjustably securing the hangers for the ground-roller. The advantage gained by the use of my form of hook lies in the fact that, in conjunction with arms 10, there is secured a range of adjustment of four (4) or more inches enabling the use of this catcher on any mower now in use or on sale. For example, these catchers, like others, are ordinarily made 17 inches in width and a purchaser of one of them may find that his mower is only 13 inches from side to side, whereupon a perfect fit may be readily made by simply bending each of arms 10 inwardly about 1 inch and attaching hooks 12 so that their portion 13 is directed outwardly with reference to the side plates of the mower. Said portion of each of said hooks being, usually, 1 inch in depth there is thus effected an increase in the width of the mower frame of 2 inches, the remaining deficiency of 2 inches being met by the inward bend of arms 10 to engage with said hooks, as aforesaid. Should it happen, as it may, that the mower is wider than the style of this catcher sold in a particular locality, then the disposition of portion 13 of hooks 12 is reversed, *i. e.* said portion is directed inwardly with reference to the mower frame and arms 10 of the catcher proper are bent outwardly effecting any desired degree of adjustment. Moreover, by loosening the aforesaid roller adjusting bolts of the mower hooks 12 may be moved backward or forward by reason of the presence therein of slot 14, and thus lip 15 of the floor of the catcher may be brought close to or moved away from the roller.

To the formation of lip 15 considerable importance is attached. The metal of the floor is sharply rebent upon itself and brought completely over rod 16, the latter forming the basis of stays 7, and thence directed upwardly and outwardly and extended considerably beyond the vertical plane of rod 16. Thus I provide at once a means for insuring the retention of the particles of grass within the catcher while the same is in use or being carried in the hand and an additional means for bringing the forward end of the receptacle into minute juxtaposition to the ground-roller, the idea of use being to depress or elevate said lip, by bending the same with the fingers.

An additional feature, and one to which I attach considerable importance, lies in the fact, before mentioned, that the frame of this catcher cannot fall forward, although freely collapsible rearwardly. This desideratum is secured not only by the peculiar manner of forming and of connecting eyelets 6 and 8, but, also, by the correlation of a portion of loop 9 and the parts of rod 16 adjacent thereto. As depicted in Fig. 2 eyelets 6 are so formed with reference to the normal position of side rods 3 as to be horizontally disposed, while the normal position of down-struck eyelets 8 is vertical, and while there is ample accommodation for forward bend 6$^a$ of eyelets 6 in the angle 8$^a$ of eyelets 8 it is apparent, upon reference to the drawing, that forward collapse of the frame is rendered physically impossible. But, as a further advantage and acting as a reinforcement of the hinged connection of eyelets just described, rod 16 is given a formation 16$^a$ as it emerges from beneath lip 15 and just before the provision of front-stays 7, as clearly depicted in Fig. 2, and in actual practice upon the inclination of said stays to fall toward the mower blades portion 16$^a$ contacts with portion 9$^a$ of loops 9 and further movement is halted.

I am quite well aware, as one skilled in the art, that it is not new to provide the forward portion of grass catchers with devices designed to be forcibly bent from side to side in order to adapt the catcher to mowers of different widths, and, also, that separate hooks have been provided, some of which are capable of forward or rearward adjustment and engaging eyelets or other suitable contrivances upon the catcher proper, but in addition to the fact that arms 10 of my invention are not liable to displacement from their original desired position when, as is usual, the front portion of the catcher is struck upon the ground in order to jar loose the grass contained therein, I am not aware that my other improvements, afore particularly described and to be pointed out in the following claims, have been anticipated.

What I claim as new and desire to secure by Letters-Patent, is:—

1. An article of the class described comprising a receptacle and separate hooks engaging a lawn mower and coöperating in the support of said receptacle, said receptacle comprising a frame whose opposite portions normally adjacent the lawn mower are formed into wide loops, hooked arms prolonged from said loops, said arms adapted to free vertical and lateral movement, said loops being substantially horizontally disposed, the portion of said hooks supporting said receptacle being arranged at right angles to their portion engaging said mower, whereby mowers of various widths may be adapted to different widths of grass catchers, substantially as described.

2. An article of the class described comprising a collapsible receptacle and separate hooks engaging a lawn mower and coöperating in the support of said receptacle, said receptacle comprising a frame whose opposite portions normally adjacent the lawn mower are formed into wide loops, hooked arms prolonged from said loops, said arms adapted to free vertical and lateral movement, said loops being substantially horizontally disposed, the portion of said hooks supporting said receptacle being arranged at right angles to their portion engaging said mower, whereby mowers of various widths may be adapted to different widths of grass catchers, and means whereby said receptacle is prevented from forwardly collapsing, substantially as described.

3. An article of the class described comprising a receptacle and separate hooks engaging a lawn mower and coöperating in the support of said receptacle, said receptacle comprising a frame whose opposite portions normally adjacent the lawn mower are formed into wide loops, hooked arms prolonged from said loops, said arms adapted to free vertical and lateral movement, said loops being substantially horizontally disposed, the portion of said hooks supporting said receptacle being arranged at right angles to their portion engaging said mower, whereby mowers of various widths may be adapted to different widths of grass catchers, and a flexible member prolonged from said receptacle and normally extending over the roller of the mower, substantially as described.

4. An article of the class described comprising a collapsible receptacle and separate hooks engaging a lawn mower and coöperating in the support of said receptacle, said receptacle comprising a frame whose opposite portions normally adjacent the lawn mower are formed into wide loops, hooked arms prolonged from said loops, said arms adapted to free vertical and lateral movement, said loops being substantially horizontally disposed, the portion of said hooks supporting said receptacle being arranged at right angles to their portion engaging said mower, whereby mowers of various widths may be adapted to different widths of grass catchers, a flexible member prolonged from said receptacle and normally extending over the roller of the mower, and means whereby said receptacle is prevented from forwardly collapsing, substantially as described.

5. An article of the class described comprising a receptacle and separate hooks engaging a lawn mower and coöperating in the support of said receptacle, said receptacle comprising an upper, a lower, and an intermediate frame, wide loops disposed in one of said frames, hooked arms prolonged from said loops, said arms adapted to free lateral and vertical movement, said loops being substantially horizontally disposed, the portion of said hooks supporting said receptacle being arranged at right angles to their portion engaging said mower, whereby mowers of various widths may be adapted to different widths of grass catchers, substantially as described.

6. An article of the class described comprising a collapsible receptacle and separate hooks engaging a lawn mower and coöperating in the support of said receptacle, said receptacle comprising an upper, a lower, and an intermediate frame, wide loops disposed in one of said frames, hooked arms prolonged from said loops, said arms adapted to free lateral and vertical movement, said loops being substantially horizontally disposed, the portion of said hooks supporting said receptacle being arranged at right angles to their portion engaging said mower, whereby mowers of various widths may be adapted to different widths of grass catchers, and means whereby said receptacle is prevented from forwardly collapsing, substantially as described.

7. An article of the class described comprising a receptacle and separate hooks engaging a lawn mower and coöperating in the support of said receptacle, said receptacle comprising an upper, a lower, and an intermediate frame, wide loops disposed in one of said frames, hooked arms prolonged from said loops, said arms adapted to free vertical and lateral movement, said loops being substantially horizontally disposed, the portion of said hooks supporting said receptacle being arranged at right angles to their portion engaging said mower, whereby mowers of various widths may be adapted to different widths of grass catchers, and a flexible member prolonged from said receptacle and normally extending over the roller of the mower, substantially as described.

8. An article of the class described comprising a collapsible receptacle and separate hooks engaging a lawn mower and coöperating in the support of said receptacle, said receptacle comprising an upper, a lower, and an intermediate frame, wide loops disposed in one of said frames, hooked arms prolonged from said loops, said arms adapted to free lateral and vertical movement, said loops being substantially horizontally disposed, the portion of said hooks supporting said receptacle being arranged at right angles to their portion engaging said mower, whereby mowers of various widths may be adapted to different widths of grass catchers, a flexible member prolonged from said receptacle and normally extending over the roller of the mower, and means whereby said receptacle is prevented from forwardly collapsing, substantially as described.

ADOLPH E. MEYER.

Witnesses:
JAMES E. GARSTANG,
ERNEST H. SCHULTZ.

---

Copies of this patent may be obtained for five cents each, by addressing the "Commissioner of Patents, Washington, D. C."